US012509330B2

(12) United States Patent
Tomura et al.

(10) Patent No.: US 12,509,330 B2
(45) Date of Patent: Dec. 30, 2025

(54) ELEVATOR CAR AND ELEVATOR

(71) Applicant: Hitachi, Ltd., Tokyo (JP)

(72) Inventors: Yoshiki Tomura, Tokyo (JP); Tomoki Kariya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/684,494

(22) PCT Filed: Aug. 19, 2021

(86) PCT No.: PCT/JP2021/030316
§ 371 (c)(1),
(2) Date: Feb. 16, 2024

(87) PCT Pub. No.: WO2023/021644
PCT Pub. Date: Feb. 23, 2023

(65) Prior Publication Data

US 2024/0425323 A1 Dec. 26, 2024

(51) Int. Cl.
*B66B 11/02* (2006.01)

(52) U.S. Cl.
CPC ................................ *B66B 11/0206* (2013.01)

(58) Field of Classification Search
CPC ............. B66B 11/0065; B66B 11/0206; B66B 11/0273
See application file for complete search history.

(56) References Cited

U.S. PATENT DOCUMENTS 4,078,623 A * 3/1978 Ohta .................. B66B 11/0226 177/147
2002/0070081 A1* 6/2002 Bledsoe .............. B66B 11/0273 187/292
2016/0159615 A1 6/2016 Maruyama
2022/0227602 A1 7/2022 Kariya et al.

FOREIGN PATENT DOCUMENTS

CN 103723602 A * 4/2014 ......... B66B 11/0206
CN 107235408 A * 10/2017 ......... B66B 11/0206
CN 107673173 A * 2/2018 ......... B66B 11/0206
(Continued)

OTHER PUBLICATIONS

International Search Report (PCT/ISA/210) issued in PCT Application No. PCT/JP2021/030316 dated Nov. 2, 2021 with English translation (4 pages).
(Continued)

*Primary Examiner* — Minh Truong
(74) *Attorney, Agent, or Firm* — Crowell & Moring LLP

(57) ABSTRACT

This elevator car includes: a car frame having a pair of vertical frames and a lower frame linking lower ends of the pair of vertical frames; a floor support beam supporting a car floor and supported on the lower frame; an under-car pulley disposed below the car floor; a pulley support member fixed to the floor support beam and rotatably supporting the under-car pulley; and a linking member linking the vertical frames and the floor support beam. The elevator car has a structure in which an upward force exerted on the pulley support member and the floor support beam by a main rope that is wound around the under-car pulley is received by the linking member and the vertical frames.

8 Claims, 8 Drawing Sheets

(56) References Cited

FOREIGN PATENT DOCUMENTS

| | | | | | |
|---|---|---|---|---|---|
| CN | 207275970 | U | | 4/2018 | |
| CN | 110203797 | A | * | 9/2019 | ......... B66B 11/0206 |
| CN | 209740465 | U | | 12/2019 | |
| CN | 110980479 | A | * | 4/2020 | |
| CN | 114162698 | A | * | 3/2022 | |
| JP | 5-246658 | A | | 9/1993 | |
| JP | 2004-359368 | A | | 12/2004 | |
| JP | 2010-241563 | A | | 10/2010 | |
| JP | 2011-42422 | A | | 3/2011 | |
| JP | 2011-51736 | A | | 3/2011 | |
| JP | 2011-152991 | A | | 8/2011 | |
| JP | 2012006695 | A | * | 1/2012 | |
| JP | 5289115 | B2 | | 9/2013 | |
| WO | WO 2015/015637 | A1 | | 2/2015 | |
| WO | WO 2020/213147 | A1 | | 10/2020 | |
| WO | WO-2024094915 | A1 | * | 5/2024 | ......... B66B 11/0206 |

OTHER PUBLICATIONS

Japanese-language Written Opinion (PCT/ISA/237) issued in PCT Application No. PCT/JP2021/030316 dated Nov. 2, 2021 with English translation (5 pages).

Japanese-language Office Action issued in Japanese Application No. 2024-701096 dated Jun. 16, 2025, with English translation (84 pages).

* cited by examiner

ELEVATOR CAR AND ELEVATOR

TECHNICAL FIELD

The present invention relates to an elevator car and an elevator.

BACKGROUND ART

In general, an elevator car of an elevator includes a tie rod that suppresses inclination of a car floor. The car floor is supported by floor support beams. The inclination of the car floor is suppressed by exerting an upward force on the floor support beams via the tie rod. As a technique related to an elevator car of an elevator including a tie rod, for example, a technique described in Patent Literature 1 is known.

CITATION LIST

Patent Literature

Patent Literature 1: JP H05-246658 A

SUMMARY OF INVENTION

Technical Problem

However, the tie rod is disposed so as to protrude toward the wall side of the hoistway more than the car outside measurement of the elevator car. For this reason, in the elevator car including the tie rod, the following inconvenience occurs.

The car outside measurement is a dimension planned for installing a device (hereinafter referred to as "hoistway device") other than the elevator car in the hoistway, and the elevator car and the hoistway device do not interfere as long as the elevator car is designed within the range of the planned dimension. Therefore, a device such as a counterweight, which is one of the hoistway devices, is designed to be accommodated between the car outside measurement and a wall of the hoistway. However, when the tie rod protrudes from the car outside measurement as described above, the arrangement and design of the hoistway device are restricted by the protrusion of the tie rod. In addition, in a construction site where installation work of an elevator is performed, it is necessary to confirm whether the elevator car and the hoistway device do not interfere with each other, and in a case where the elevator car and the hoistway device interfere with each other, it is necessary to review the arrangement of the hoistway device and the structure of the elevator car.

An object of the present invention is to provide an elevator car and an elevator capable of suppressing inclination of a car floor without providing a tie rod.

Solution to Problem

In order to solve the above problems, for example, the configuration described in the claims is adopted.

The present application includes a plurality of means for solving the above problems, and one of them is an elevator car including: a car frame having a pair of vertical frames and a lower frame linking lower ends of the pair of vertical frames; a floor support beam supporting a car floor and supported on the lower frame; an under-car pulley disposed below the car floor; a pulley support member fixed to the floor support beam and rotatably supporting the under-car pulley; and a linking member linking the vertical frames and the floor support beam. The elevator car has a structure in which an upward force exerted on the pulley support member and the floor support beam by a main rope that is wound around the under-car pulley is received by the linking member and the vertical frames.

Advantageous Effects of Invention

With the present invention, it is possible to suppress the inclination of the car floor without providing the tie rod.

Problems, configurations, and effects other than those described above will be clarified by the following description of an embodiment.

DESCRIPTION OF EMBODIMENT

Figure 1:
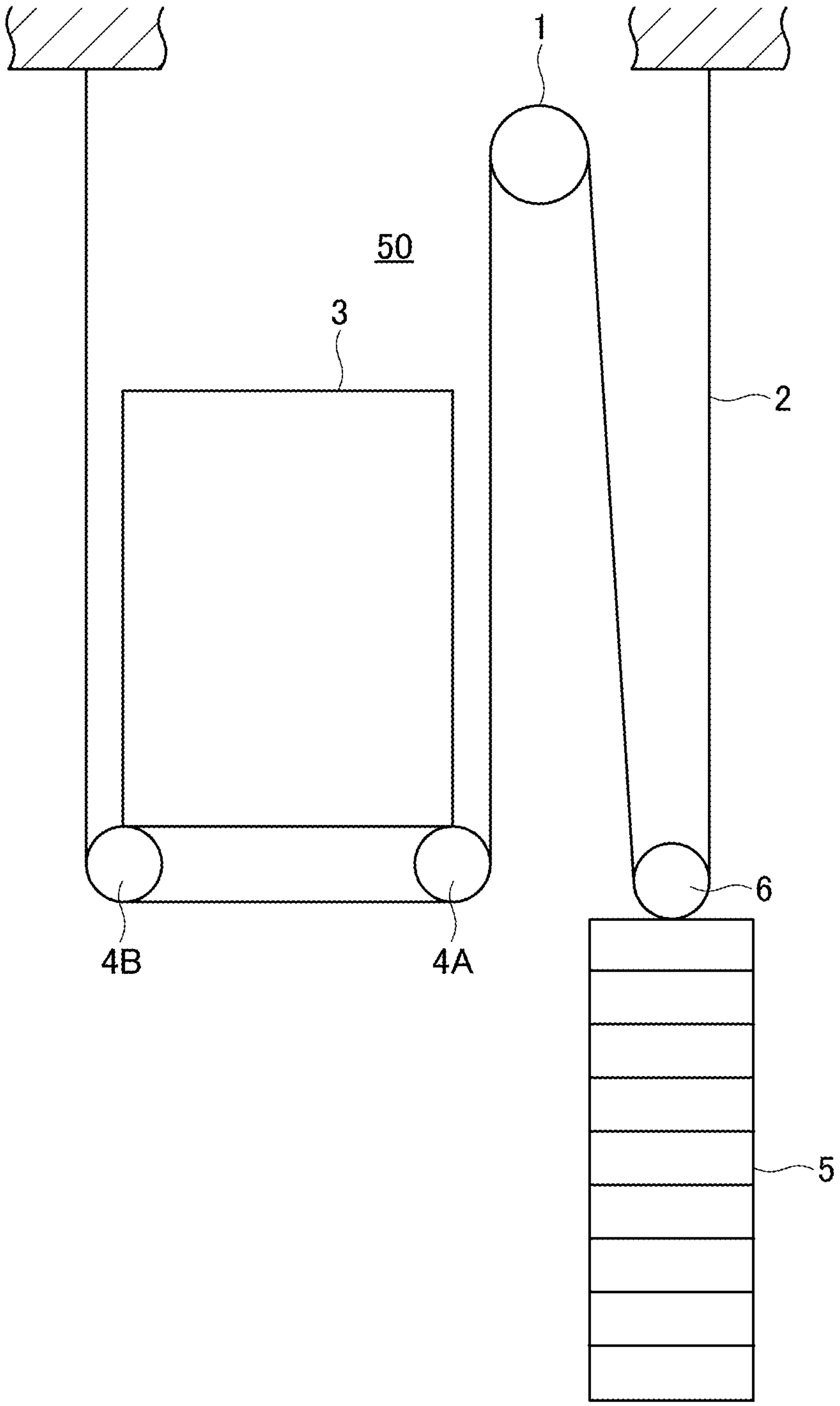
FIG. 1 is a schematic configuration diagram of an elevator according to an embodiment.

An embodiment of the present invention will be hereinafter described in detail with reference to the drawings. In the present specification and the drawings, elements having substantially the same function or configuration are denoted by the same reference numerals, and redundant description is omitted.

FIG. 1 is a schematic configuration diagram of an elevator according to an embodiment.

As illustrated in FIG. 1, the elevator includes a hoisting machine 1, a main rope 2, an elevator car 3, a counterweight 5, and a pulley 6. The elevator car 3 includes a pair of under-car pulleys 4A and 4B. The elevator car 3 moves up and down in a hoistway 50 according to the movement of the main rope 2 wound around the pair of under-car pulleys 4A and 4B.

The hoisting machine 1 is a device that hoists the main rope 2 to move the elevator car 3 up and down. The hoisting machine 1 is installed in an upper portion of the hoistway 50. One end and the other end of the main rope 2 are fixed to the uppermost portion of the hoistway 50. The main rope 2 is wound around the pair of under-car pulleys 4A and 4B, the hoisting machine 1, and the pulley 6. The elevator car 3 moves up and down by being guided by a pair of guide rails (not illustrated). The pair of under-car pulleys 4A and 4B is disposed below the elevator car 3. The counterweight 5 is a weight for reducing the load of the hoisting machine 1 by maintaining the mass balance with the elevator car 3. When the main rope 2 is hoisted by the hoisting machine 1, the counterweight 5 moves up and down in a direction opposite to the elevator car 3. The pulley 6 is disposed on the top of the counterweight 5 and moves up and down together with the counterweight 5.

Figure 2:
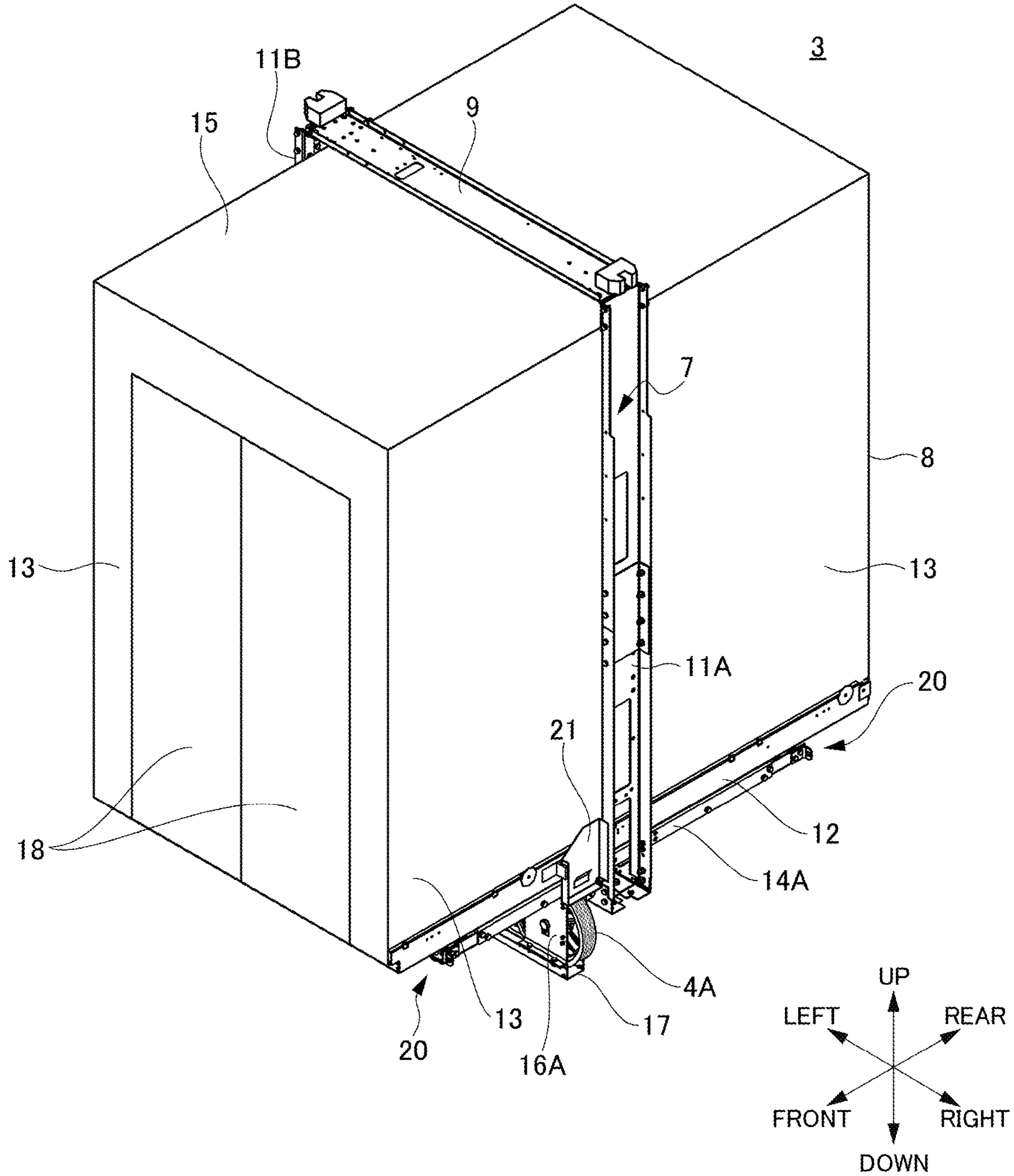
FIG. 2 is a perspective view illustrating an appearance of an elevator car according to the embodiment.

FIG. 2 is a perspective view illustrating an appearance of an elevator car according to the embodiment.

In the present embodiment, the front-rear, up-down, and left-right directions are defined with reference to the line of sight of the elevator user facing the elevator car 3. In this case, when viewed from the elevator user, the front side is the front direction, the back side is the rear direction, the upper side is the upper direction, the lower side is the lower direction, the left side is the left direction, and the right side is the right direction.

As illustrated in FIG. 2, the elevator car 3 includes a car frame 7 and a car cage 8 disposed inside the car frame 7. The car cage 8 has a housing space for carrying luggage and a person therein. The car cage 8 is formed by a car floor 12, side plates 13, and a ceiling 15. The car floor 12 and the ceiling 15 are disposed in a state of facing each other in the up-down direction via the housing space. The side plates 13 are disposed so as to surround four sides of the housing space except for a part of a car door 18.

The car frame 7 is formed in a vertically long rectangular shape when viewed from the front-rear direction. The car frame 7 is disposed so as to surround the car cage 8. The car frame 7 includes an upper frame 9 disposed in an upper part of the car cage 8, a lower frame 10 (see FIG. 3) disposed in a lower part of the car cage 8, and a pair of vertical frames 11A and 11B disposed on left and right side portions of the car cage 8. The upper frame 9 is a member extending long in the left-right direction. The upper frame 9 is horizontally bridged between the upper ends of the pair of vertical frames 11A and 11B. One end of the upper frame 9 in the longitudinal direction is fixed to the upper end of the vertical frame 11A, and the other end of the upper frame 9 in the longitudinal direction is fixed to the upper end of the vertical frame 11B. As a result, the upper ends of the pair of vertical frames 11A and 11B are linked by the upper frame 9.

The pair of vertical frames 11A and 11B is disposed so as to face each other in the left-right direction. Each of the vertical frames 11A and 11B is a member extending long in the up-down direction. Each of the vertical frames 11A and 11B is supported by the pair of guide rails described above. The guide rails are elongated members vertically installed on the wall of the hoistway 50.

On the other hand, the lower frame 10 is disposed at a position facing the upper frame 9 via the car cage 8. The lower frame 10 is a member extending long in the left-right direction. The lower frame 10 is horizontally bridged between the lower ends of the pair of vertical frames 11A and 11B. One end of the lower frame 10 in the longitudinal direction is fixed to the lower end of the vertical frame 11A, and the other end of the lower frame 10 in the longitudinal direction is fixed to the lower end of the vertical frame 11B. As a result, the lower ends of the pair of vertical frames 11A and 11B are linked by the lower frame 10.

Figure 3:
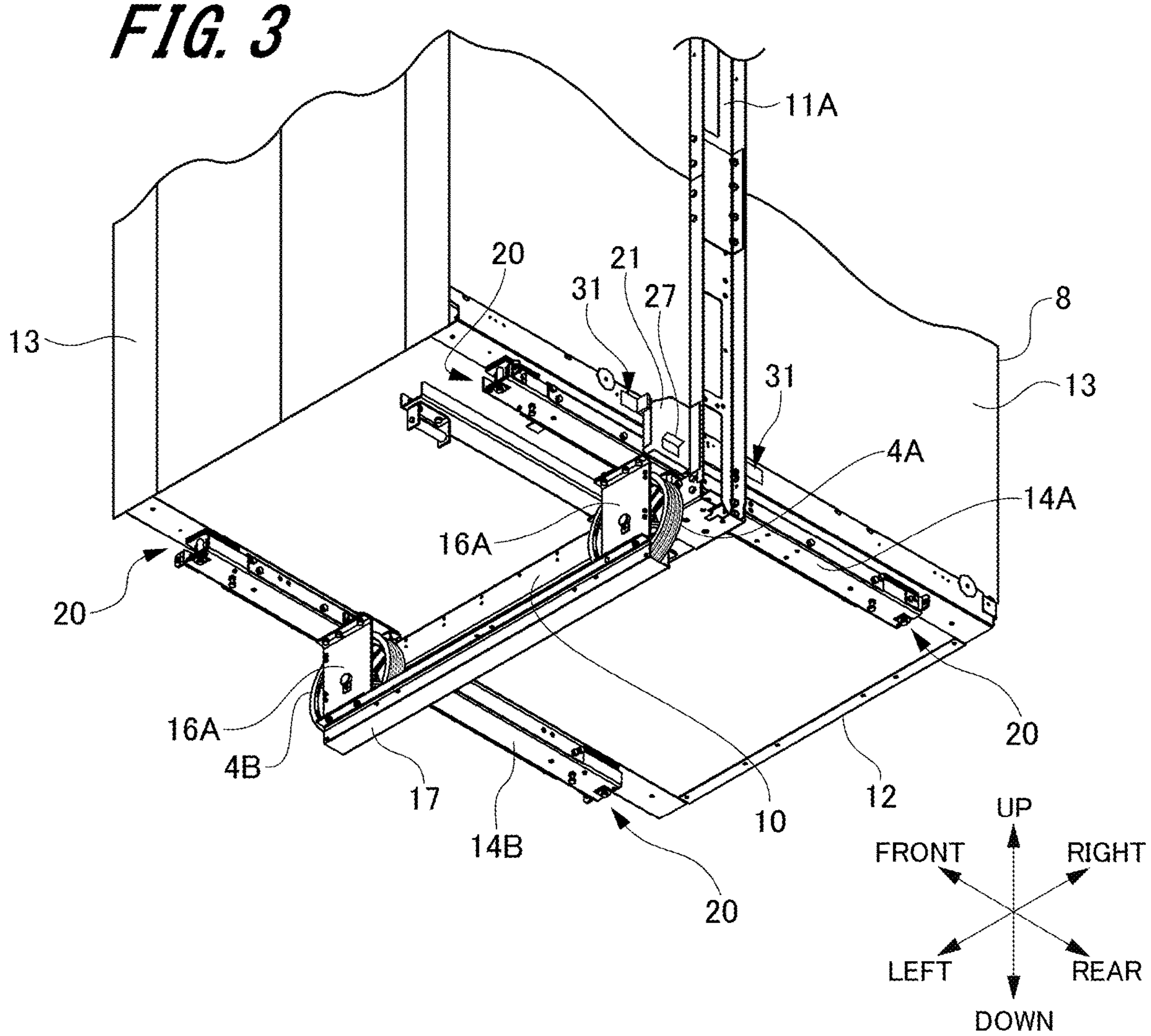
FIG. 3 is a diagram of the elevator car illustrated in FIG. 2 as viewed obliquely from below.

As illustrated in FIG. 3, the lower frame 10 supports the car floor 12 via a pair of floor support beams 14A and 14B. The pair of floor support beams 14A and 14B are beams that support the car floor 12. Anti-vibration portions 20 are provided at both ends in the longitudinal direction of the floor support beam 14A, and other anti-vibration portions 20 are provided at both ends in the longitudinal direction of the floor support beam 14B. The anti-vibration portions 20 are portions that suppress vibration of the car cage 8 including the car floor 12. The car floor 12 is supported by the pair of floor support beams 14A and 14B via a plurality of (four in the present embodiment) anti-vibration portions 20.

Figure 4:
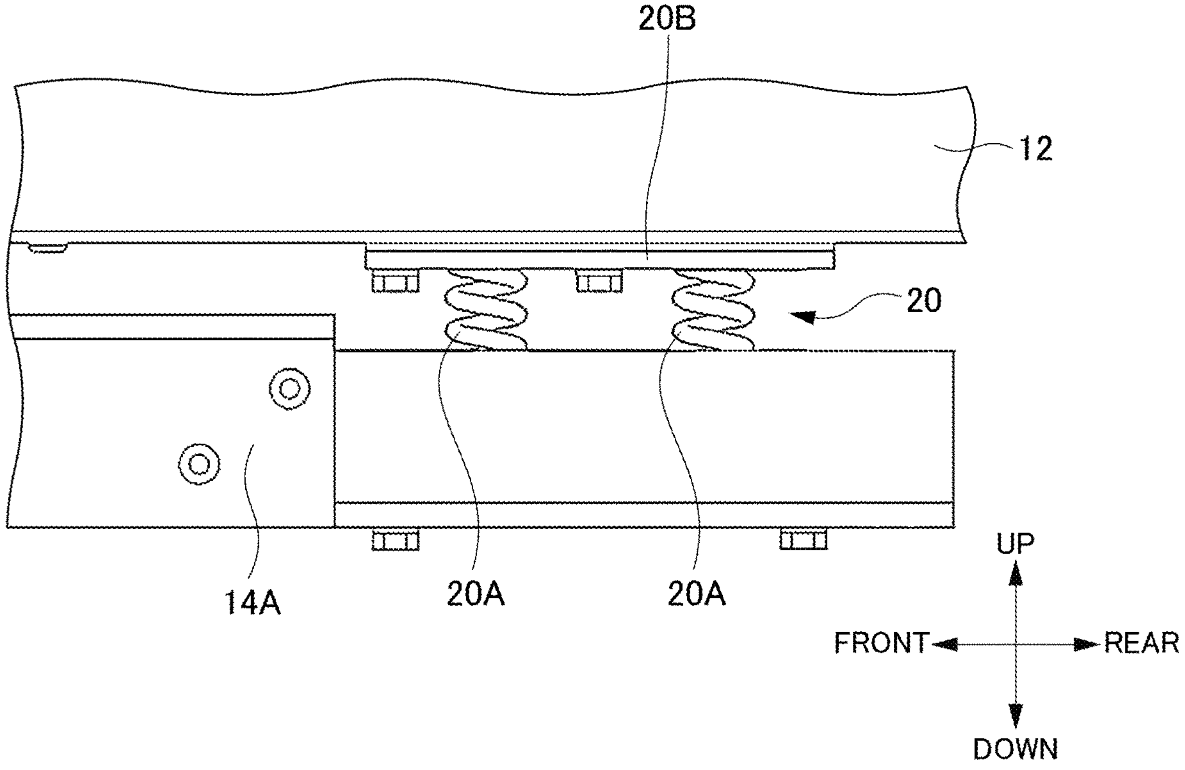
FIG. 4 is a diagram illustrating a configuration of an anti-vibration portion.

As illustrated in FIG. 4, the anti-vibration portion 20 includes two coil springs 20A, a plate-shaped spring seat 20B attached to the lower surface of the car floor 12, and a plate-shaped spring seat (not illustrated) attached to the bottom surface of the floor support beam 14A. The coil spring 20A is an elastic member for anti-vibration. The spring seat 20B is provided with a spring receiving hole (not illustrated) that receives the end of the coil spring 20A. The same applies to the spring seat attached to the bottom surface of the floor support beam 14A. Note that the anti-vibration portion 20 is not limited to the configuration using the coil springs, and may have a configuration using rubber, for example.

The floor support beam 14A is disposed at one end (right end) of the lower frame 10 in the longitudinal direction, and the floor support beam 14B is disposed at the other end (left end) of the lower frame 10 in the longitudinal direction. In addition, each of the floor support beams 14A and 14B is fixed to the upper surface of the lower frame 10 by a bolt (not illustrated) in a state of being placed on the lower frame 10. Each of the floor support beams 14A and 14B is horizontally disposed in a direction perpendicular to the lower frame 10. Specifically, the lower frame 10 is disposed in parallel with the left-right direction, and each of the floor support beams 14A and 14B is disposed in parallel with the front-rear direction.

Each of the floor support beams 14A and 14B is a member extending long in the front-rear direction and has a closed cross-sectional structure. The closed cross-sectional structure is a structure with a closed cross section, and more specifically, is a rectangular or cylindrical cross-sectional structure. In the present embodiment, each of the floor support beams 14A and 14B has a rectangular cross-sectional structure. As described above, by using the floor support beams 14A and 14B having the closed cross-sectional structure, the rigidity of each of the floor support beams 14A and 14B can be increased.

The car door 18 is installed in a front portion of the car cage 8. The car door 18 is provided to be openable and closable in the left-right direction. As illustrated in FIG. 3, the pair of under-car pulleys 4A and 4B is disposed below the car cage 8. The pair of under-car pulleys 4A and 4B is disposed on the front side than the vertical frames 11A and 11B are. One under-car pulley 4A is attached to the floor support beam 14A, and the other under-car pulley 4B is attached to the floor support beam 14B. Hereinafter, attachment structures of the under-car pulleys 4A and 4B will be described in detail. The attachment structure of the under-car pulley 4A to the floor support beam 14A and the attachment structure of the under-car pulley 4B to the floor support beam 14B are common to each other. Therefore, in the present specification, in order to avoid overlapping of the description, only the attachment structure of the under-car pulley 4A to the floor support beam 14A will be described.

Figure 5:
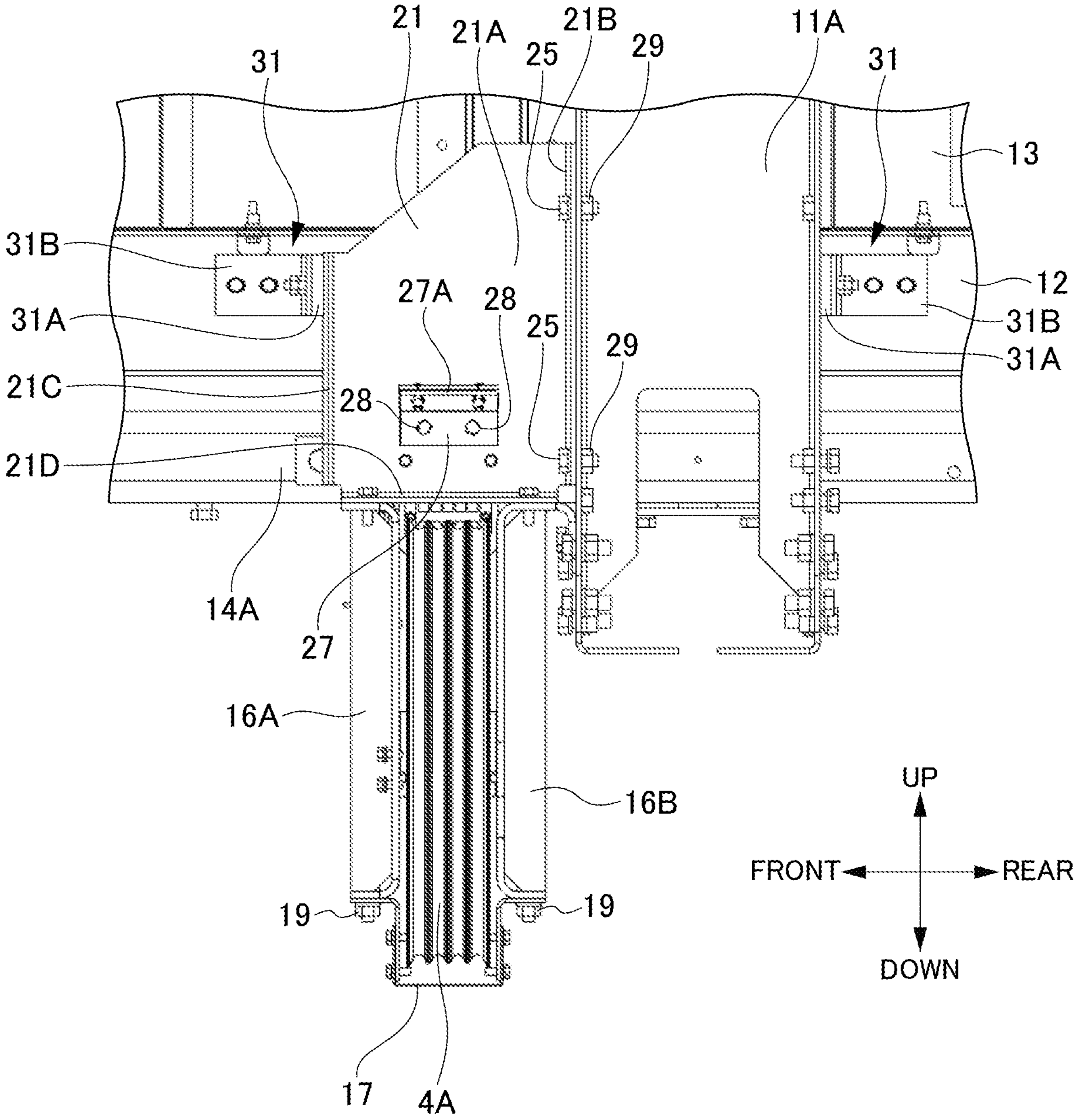
FIG. 5 is a diagram of a main portion of the elevator car illustrated in FIG. 2 as viewed from the left-right direction.

As illustrated in FIGS. 3 and 5, the under-car pulley 4A is supported by a pair of pulley support brackets 16A and 16B. The pair of pulley support brackets 16A and 16B corresponds to a pulley support member. The pair of pulley support brackets 16A and 16B is disposed so as to face each other in the front-rear direction via the under-car pulley 4A. The upper end of the pulley support bracket 16A is fixed to the lower surface of the floor support beam 14A using a bolt (not illustrated). Similarly, the upper end of the pulley support bracket 16B is fixed to the lower surface of the floor support beam 14A using a bolt (not illustrated). The pair of pulley support brackets 16A and 16B rotatably supports a rotation shaft of the under-car pulley 4A. In addition, the under-car pulley 4A is disposed below the car floor 12, and the floor support beam 14A is disposed between the under-car pulley 4A and the car floor 12 in the up-down direction.

A rope guide 17 is attached to lower ends of the pair of pulley support brackets 16A and 16B. The rope guide 17 is a rail-shaped member that is long in the left-right direction. One end of the rope guide 17 in the longitudinal direction is fixed to the lower ends of the pair of pulley support brackets 16A and 16B supporting the under-car pulley 4A with bolts 19 (see FIG. 5). In addition, the other end of the rope guide 17 in the longitudinal direction is fixed to the lower ends of the pair of pulley support brackets 16A and 16B supporting the under-car pulley 4B with bolts (not illustrated). The rope guide 17 serves to protect the main rope 2 so that a foreign object is not caught in the main rope 2 to be wound around the under-car pulleys 4A and 4B.

Here, the elevator car 3 according to the present embodiment includes a linking member 21 that links the vertical frame 11A and the floor support beam 14A, and a linking member (not illustrated) that links the vertical frame 11B and the floor support beam 14B. The attachment structure of the linking member 21 and the attachment structure of the linking member (not illustrated) are common to each other. Therefore, in the present specification, only the attachment structure of the linking member 21 will be described in order to avoid overlapping of the description.

Figure 6:
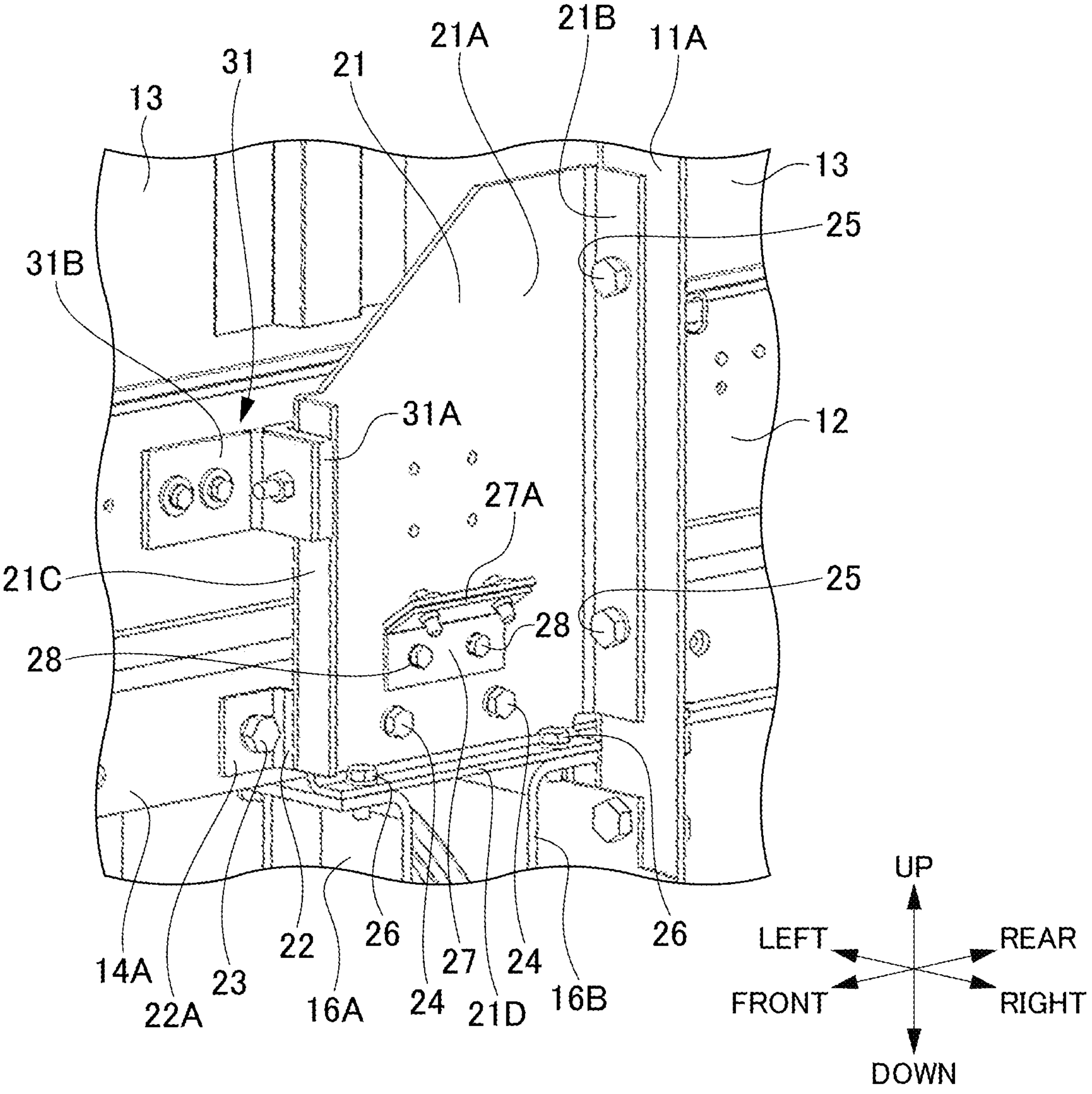
FIG. 6 is a diagram of the main portion of the elevator car illustrated in FIG. 2 as viewed obliquely.

As illustrated in FIG. 5, the linking member 21 is disposed immediately above the under-car pulley 4A when viewed from the left-right direction corresponding to the depth direction of the paper surface. The linking member 21 is an integral structure object obtained by bending a metal plate. As illustrated in FIGS. 5 and 6, the linking member 21 integrally includes a first plate portion 21A, a second plate portion 21B, a third plate portion 21C, and a fourth plate portion 21D. The first plate portion 21A is a plate portion having the largest area among the four plate portions 21A to 21D. The first plate portion 21A is disposed in parallel with a virtual plane parallel to the front-rear direction and the up-down direction. The second plate portion 21B and the third plate portion 21C are formed in a state of being bent at a right angle from the corresponding two side edges of the first plate portion 21A. In addition, the second plate portion 21B and the third plate portion 21C are disposed in a state of facing each other in the front-rear direction. The fourth plate portion 21D is formed in a state of being bent at a right angle in the same direction as the second plate portion 21B and the third plate portion 21C from the lower side of the first plate portion 21A.

Figure 7:
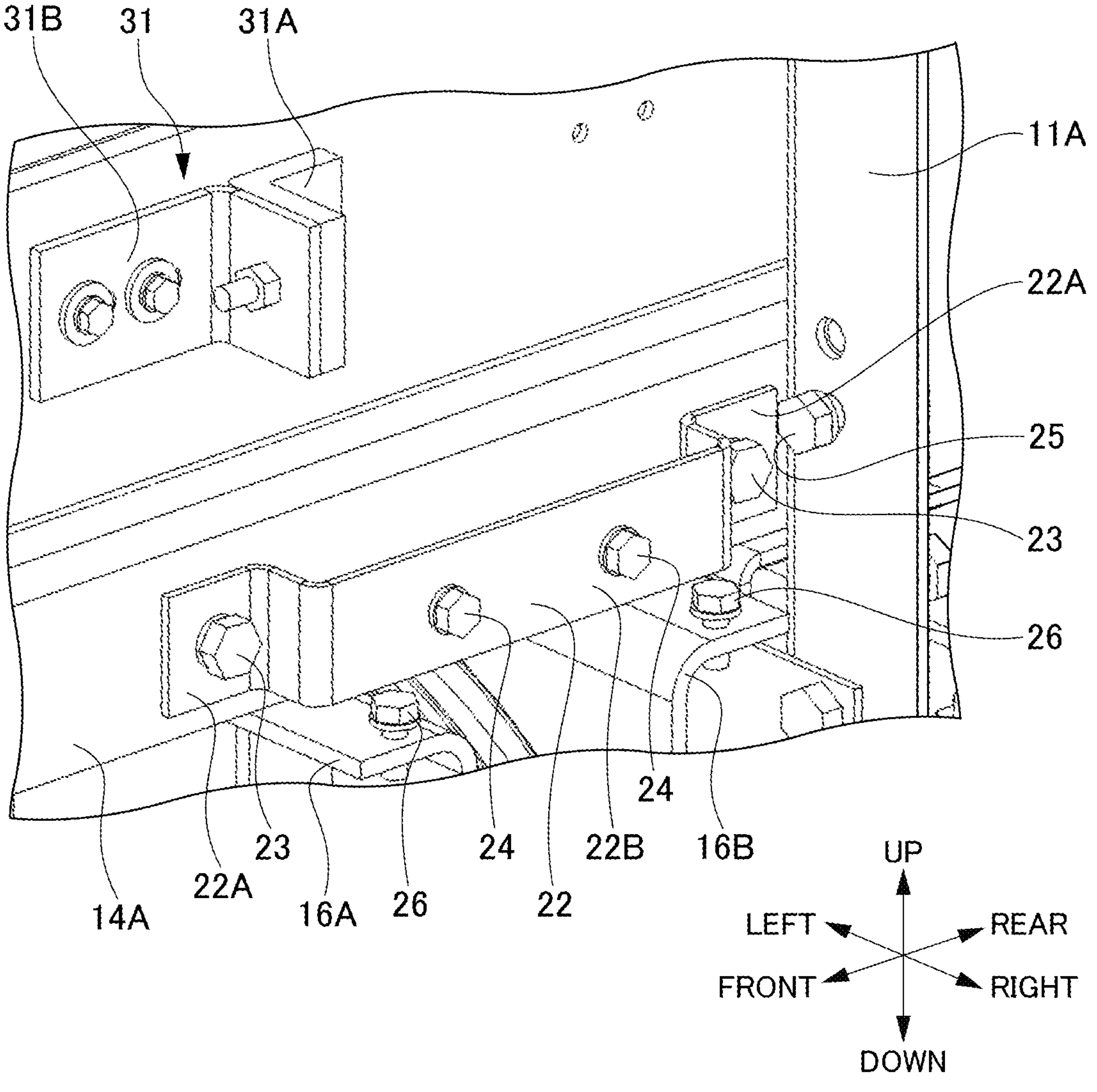
FIG. 7 is a diagram illustrating a configuration of an intermediate member.

The linking member 21 configured as described above is fixed to the floor support beam 14A via an intermediate member 22. As illustrated in FIG. 7, the intermediate member 22 is formed in a hat shape. In FIG. 7, the linking member 21 is not illustrated in order to illustrate the structure of the intermediate member 22.

The intermediate member 22 is an integral structure object obtained by bending a metal plate. The intermediate member 22 integrally includes a pair of fixing portions 22A and a connecting portion 22B. A predetermined step is provided between the pair of fixing portions 22A and the connecting portion 22B. The pair of fixing portions 22A is fixed to one side surface (right side surface) of the floor support beam 14A by bolts 23. The connecting portion 22B is disposed in a state of protruding in the right direction from one side surface of the floor support beam 14A. Two screw holes (not illustrated) are provided in the connecting portion 22B, and bolts 24 are attached to the respective screw holes. The bolts 24 are each a bolt for fastening the first plate portion 21A of the linking member 21 and the connecting portion 22B of the intermediate member 22. On the other hand, the first plate portion 21A of the linking member 21 is provided with two bolt insertion holes (not illustrated) corresponding to the two screw holes described above. The first plate portion 21A of the linking member 21 is fixed to the connecting portion 22B of the intermediate member 22 by the two bolts 24. As a result, the linking member 21 is fixed to the floor support beam 14A via the intermediate member 22.

In addition, as illustrated in FIG. 6, the second plate portion 21B of the linking member 21 is fixed to the front surface of the vertical frame 11A by two bolts 25. A nut 29 (see FIG. 5) is attached to the male screw of each of the bolts 25. As a result, the linking member 21 and the vertical frame 11A are fixed to each other by the fastening force of the bolt 25 and the nut 29. On the other hand, the fourth plate portion 21D of the linking member 21 is fixed to the upper ends of the pair of pulley support brackets 16A and 16B by two bolts 26. A part of the pair of pulley support brackets 16A and 16B is disposed to protrude in the right direction from the floor support beam 14A, and each of the bolts 26 is fastened in a state where the fourth plate portion 21D is placed on the protruding portion. As a result, a part of the linking member 21 is fixed to the pair of pulley support brackets 16A and 16B which are pulley support members.

As illustrated in FIGS. 5 and 6, a foreign object entrance prevention cover 27 is attached to the linking member 21. The foreign object entrance prevention cover 27 is a cover provided mainly for preventing entrance of a foreign object into the under-car pulley 4A. The foreign object entrance prevention cover 27 is fixed to the first plate portion 21A of the linking member 21 by two bolts 28. The foreign object entrance prevention cover 27 integrally includes a shielding portion 27A protruding obliquely upward from the outer surface of the first plate portion 21A. When viewed vertically downward from a position above the linking member 21, the shielding portion 27A is disposed in a state of shielding the outer peripheral portion of the under-car pulley 4A. Note that the foreign object entrance prevention cover 27 is attached not only to the right linking member 21 in which the vertical frame 11A and the floor support beam 14A are disposed but also to the left linking member (not illustrated) in which the vertical frame 11B and the floor support beam 14B are disposed.

In addition, as illustrated in FIG. 5, the floor support beam 14A and the linking member 21 are sandwiched between the pair of steady rest portions 31 in the front-rear direction corresponding to the longitudinal direction of the floor support beam 14A. As illustrated in FIGS. 6 and 7, the steady rest portions 31 each include a rubber plate 31A as an elastic body and a metallic support plate 31B that supports the rubber plate 31A. The rubber plate 31A is formed in an L shape, and the support plate 31B is also formed in an L shape. The rubber plate 31A and the support plate 31B are coupled back to back. The rubber plate 31A is pressed against the third plate portion 21C of the linking member 21. The support plate 31B is fixed to the side surface of the car floor 12 by two bolts 32. In the other steady rest portion 31 disposed on the opposite side of the linking member 21 with the vertical frame 11A interposed therebetween, the rubber plate 31A is pressed against the rear surface of the vertical frame 11A.

Figure 8:
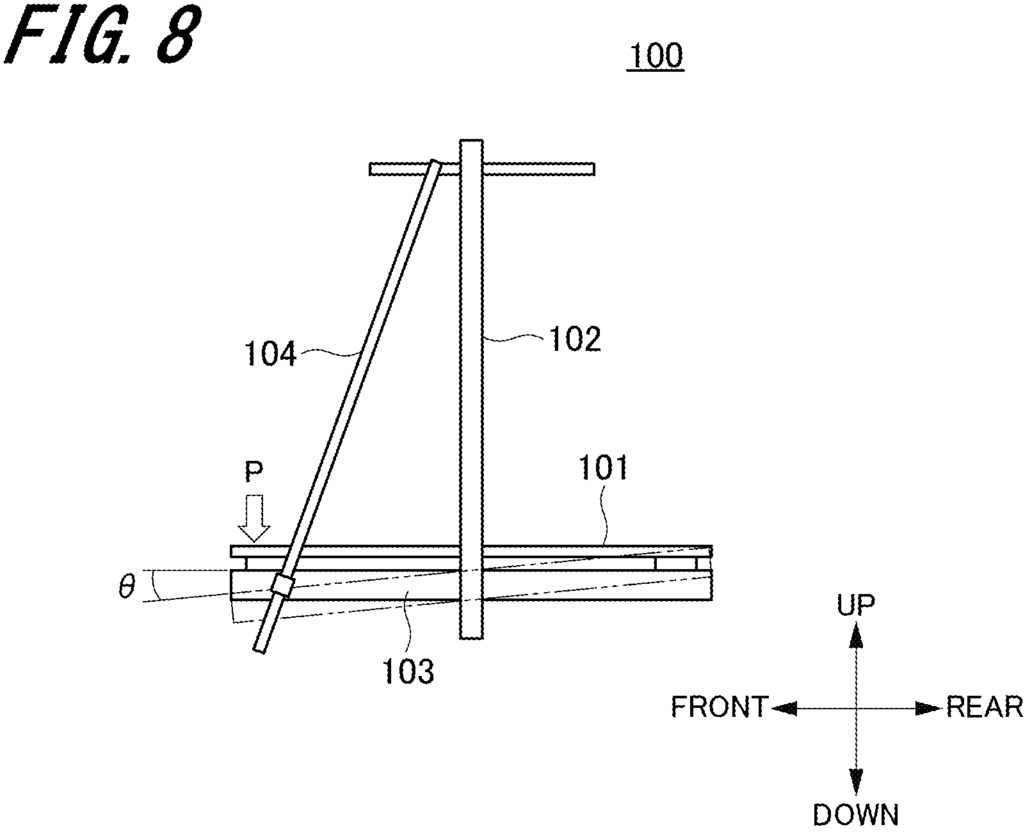
FIG. 8 is a schematic view illustrating an elevator car according to a comparative mode.

FIG. 8 is a schematic view illustrating an elevator car according to a comparative mode.

As illustrated in FIG. 8, an elevator car 100 according to the comparative mode includes a car floor 101, a vertical frame 102, a floor support beam 103, and a tie rod 104. In the elevator car 100 according to the comparative mode, when a downward load P is exerted on the front side of the floor support beam 103, inclination of an angle θ occurs in the floor support beam 103. When the floor support beam 103 is inclined in this manner, inclination also occurs in the car floor 101 supported by the floor support beam 103. Therefore, in the elevator car 100 according to the comparative mode, the front end of the floor support beam 103 is attached to the lower end of the tie rod 104, and the front side of the floor support beam 103 is raised by the tie rod 104, thereby eliminating (adjusting) the inclination of the floor support beam 103 and the car floor 101. The downward load P is an unbalanced load generated when the mass balance of the entire parts constituting the elevator car 100 becomes uneven between the front side and the rear side. Note that FIG. 9 illustrates, as an example, the unbalanced load P generated when the load exerted on the front side of the floor support beam 103 is larger than the load exerted on the rear side.

Figure 9:
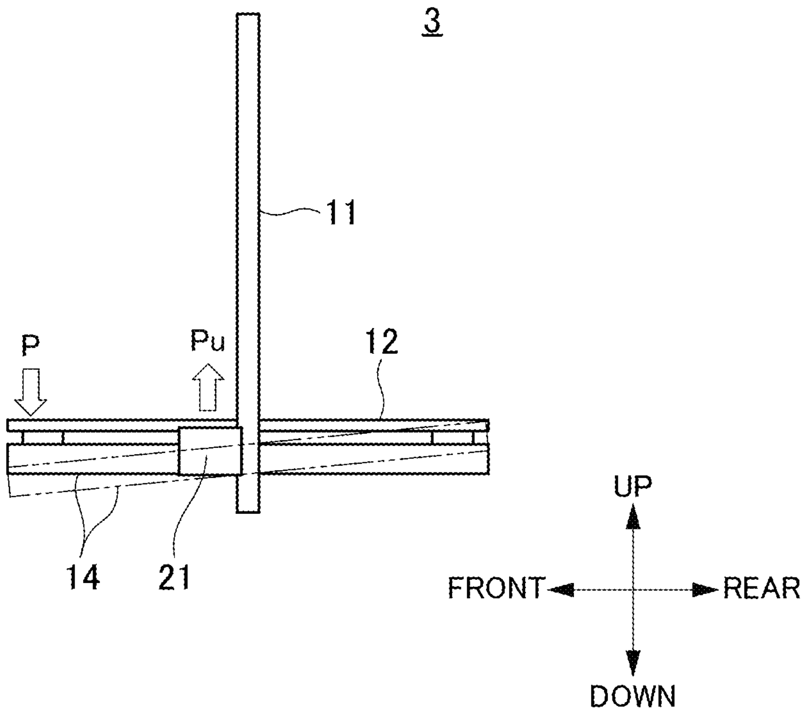
FIG. 9 is a schematic view illustrating an elevator car according to the embodiment.

On the other hand, in the elevator car 3 according to the present embodiment, as illustrated in FIG. 9, a vertical frame 11A and the floor support beam 14A are linked by the linking member 21. In addition, as illustrated in FIG. 5, the pair of pulley support brackets 16A and 16B is fixed to the floor support beam 14A. The pair of pulley support brackets 16A and 16B is disposed on the front side than the vertical frame 11A is. Therefore, as illustrated in FIG. 1, when the elevator car 3 is lifted by winding the main rope 2 around the pair of under-car pulleys 4A and 4B, an upward force corresponding to the self-weight of the elevator car 3 is exerted on the under-car pulleys 4A and 4B and the pair of pulley support brackets 16A and 16B by the main rope 2. In addition, the upward force described above is also exerted on the floor support beams 14A and 14B via the pair of pulley support brackets 16A and 16B. Therefore, on the right side of the elevator car 3, as illustrated in FIG. 9, an upward force Pu opposing the downward load (unbalanced load) P exerted on the front side of the floor support beam 14A is exerted on the floor support beam 14A. Therefore, the inclination of the floor support beam 14A and the car floor 12 can be eliminated. Similarly, on the left side of the elevator car 3, an upward force opposing the downward load (unbalanced load) exerted on the front side of the floor support beam 14B is exerted on the floor support beam 14B. Therefore, the inclination of the floor support beam 14B and the car floor 12 can be eliminated.

In addition, on the right side of the elevator car 3, the vertical frame 11A and the floor support beam 14A are linked by the linking member 21. Therefore, the linking member 21 and the vertical frame 11A receive an upward force exerted on the pair of pulley support brackets 16A and 16B and the floor support beams 14A and 14B. Specifically, an upward force exerted on the floor support beam 14A is transmitted to the vertical frame 11A via the intermediate member 22 and the linking member 21. Therefore, the second plate portion 21B of the linking member 21 is pressed against the front surface of the vertical frame 11A. In addition, the position and posture of the vertical frame 11A in the hoistway 50 are held constant by guide rails (not illustrated). Therefore, even if the linking member 21 is pressed against the vertical frame 11A by receiving the above-described upward force, the position and posture of the vertical frame 11A do not change. That is, in this structure, the linking member 21 receiving the upward force is supported by the vertical frame 11A. Therefore, the posture of the floor support beam 14A can be horizontally held by the vertical frame 11A and the linking member 21. In addition, also on the left side of the elevator car 3, similarly to the right side of the elevator car 3, the vertical frame 11B and the floor support beam 14B are linked by the linking member (not illustrated). Therefore, the posture of the floor support beam 14B can be horizontally held by the vertical frame 11B and the linking member.

Effects of Embodiment

With the elevator car 3 according to the present embodiment and the elevator including the elevator car 3, the following effects can be obtained.

In the present embodiment, the pair of pulley support brackets 16A and 16B is fixed to the floor support beams 14A and 14B supporting the car floor 12, and the vertical frames 11A and 11B and the floor support beams 14A and 14B are linked, respectively, by the linking member 21, and the linking member (not illustrated). Therefore, the inclination of the floor support beams 14A and 14B can be eliminated using the upward force exerted on the pair of pulley support brackets 16A and 16B by the main rope 2 to be wound around the under-car pulleys 4A and 4B. As a result, it is possible to suppress the inclination of the car floor 12 without providing the tie rod 104 required in the elevator car 100 according to the comparative mode. That is, a tie-rod-less elevator car can be realized.

In addition, in the present embodiment, the linking member 21 is disposed immediately above the under-car pulleys 4A and 4B. Therefore, the upward force exerted on the pair of pulley support brackets 16A and 16B by the main rope 2 to be wound around the under-car pulleys 4A and 4B can be efficiently transferred to the linking member 21.

In addition, in the present embodiment, the foreign object entrance prevention cover 27 is attached to the linking member 21. For this reason, for example, when a foreign object falls from a position above the linking member 21, the foreign object hits the shielding portion 27A of the foreign object entrance prevention cover 27 and stays there, or bounces back there and is deviated to the side of the under-car pulleys 4A and 4B. Therefore, it is possible to prevent entrance of the foreign object to the under-car pulleys 4A and 4B.

In addition, in the present embodiment, by using the floor support beams 14A and 14B having the closed cross-sectional structure, the rigidity of each of the floor support beams 14A and 14B is increased. Therefore, deflection of the floor support beams 14A and 14B can be suppressed.

In addition, in the present embodiment, the intermediate member 22 is fixed to one side surface of the floor support beam 14A, and the linking member 21 is fixed to the floor support beam 14A via the intermediate member 22. Therefore, by setting the protrusion dimension of the intermediate member 22 (the step between the fixing portion 22A and the connecting portion 22B) in accordance with the relationship between the fixing position of the intermediate member 22 with respect to the vertical frame 11A and the fixing position of the linking member 21 with respect to the floor support beam 14A, the vertical frame 11A and the floor support beam 14A can be linked by the linking member 21 without complicating the structure of the linking member 21. As a result, the first plate portion 21A of the linking member 21 has flat plate structure, and the rigidity of the entire linking member 21 can be enhanced. Such effect can be also obtained in a case where the intermediate member 22 is fixed to one side surface of the floor support beam 14B, and the linking member is fixed to the floor support beam 14B via the intermediate member 22.

In addition, in the present embodiment, the fourth plate portion 21D which is a part of the linking member 21 is fixed to the pair of pulley support brackets 16A and 16B. As a result, the upward force exerted on the pair of pulley support brackets 16A and 16B can be charged to both the floor support beams 14A and 14B and the linking member 21. Therefore, the load exerted on the floor support beams 14A and 14B by the upward force can be reduced.

In addition, in the present embodiment, the vertical frame 11A and the linking member 21 are sandwiched between the pair of steady rest portions 31 in the longitudinal direction of the floor support beam 14A. As a result, it is possible to suppress swinging of the linking member 21 when the elevator car 3 moves up and down. This effect can be also obtained in a case where the vertical frame 11B and the linking member are sandwiched between the pair of steady rest portions 31 in the longitudinal direction of the floor support beam 14B.

In addition, in the present embodiment, the under-car pulleys 4A and 4B are disposed on the front side than the vertical frames 11A and 11B are. Therefore, when a downward load (unbalanced load) is exerted on the front side of the vertical frames 11A and 11B, the upward force against the load can be generated on the front side of the vertical frames 11A and 11B.

Modifications and the Like

Note that the present invention is not limited to the above-described embodiment, and includes various modifications. For example, in the above-described embodiment, the contents of the present invention are described in detail for facilitating understanding, but the present invention is not necessarily limited to one including all the configurations described in the above-described embodiment. In addition, a part of the configuration of one embodiment can be replaced with the configuration of another embodiment. In addition, it is also possible to add to the configuration of one embodiment the configuration of another embodiment. In addition, a part of the configuration of each embodiment can be deleted, can be added with another configuration, or can be substituted with another configuration.

For example, in the above embodiment, the under-car pulleys 4A and 4B are disposed on the front side than the vertical frames 11A and 11B are, but the present invention is not limited thereto. For example, although not illustrated, the under-car pulleys 4A and 4B may be disposed on the rear side than the vertical frames 11A and 11B are. In a case where the under-car pulleys 4A and 4B are disposed on the rear side than the vertical frames 11A and 11B are, when a downward load (unbalanced load) is exerted on the rear side of the vertical frames 11A and 11B, the upward force against the load can be generated on the rear side of the vertical frames 11A and 11B.

In addition, in the above embodiment, the linking member 21 is fixed to the floor support beams 14A and 14B via the intermediate member 22, but the present invention is not limited thereto, and for example, the first plate portion 21A of the linking member 21 may have a stepped structure to directly fix the linking member 21 to the floor support beams 14A and 14B.

REFERENCE SIGNS LIST

2 Main rope
3 Elevator car
4A, 4B Under-car pulley
7 Car frame
10 Lower frame
11A, 11B Vertical frame
12 Car floor
14A, 14B Floor support beam
16A, 16B Pulley support bracket (Pulley support member)
21 Linking member
22 Intermediate member
27 Foreign object entrance prevention cover
31 Steady rest portion
50 Hoistway

The invention claimed is:

1. An elevator car comprising:
 a car frame having a pair of vertical frames and a lower frame directly connected to lower ends of the pair of vertical frames;
 a floor support beam supporting a car floor and supported on the lower frame;
 an under-car pulley disposed below the car floor;
 a pulley support member fixed to the floor support beam and supporting the under-car pulley; and
 a linking member linking the vertical frames and the floor support beam,
 wherein the elevator car is configured such that an upward force exerted on the pulley support member and the floor support beam by a main rope that is wound around the under-car pulley is received by the linking member and the vertical frames, and
 wherein the linking member is disposed immediately above the under-car pulley such that the linking member and the under-car pulley overlap each other along a front-to-back direction of the elevator car, and such that the upward force acts on the linking member directly without going through the floor support beam and acts from the linking member to the vertical frames.

2. The elevator car according to claim 1, further comprising a foreign object entrance prevention cover attached to the linking member.

3. The elevator car according to claim 1, wherein the floor support beam has a closed cross-sectional structure.

4. The elevator car according to claim 1, further comprising an intermediate member fixed to one side surface of the floor support beam in a state of protruding from the one side surface,
 wherein the linking member is fixed to the floor support beam via the intermediate member.

5. The elevator car according to claim 1, wherein a part of the linking member is fixed to the pulley support member.

6. The elevator car according to claim 1, further comprising a pair of steady rest portions sandwiching the vertical frames and the linking member in a longitudinal direction of the floor support beam.

7. The elevator car according to claim 1, wherein the under-car pulley is disposed closer to a front side or a rear side of the elevator car than the vertical frames are.

8. An elevator comprising
 an elevator car moving up and down in a hoistway,
 the elevator car including:
 a car frame having a pair of vertical frames and a lower frame directly connected to lower ends of the pair of vertical frames;
 a floor support beam supporting a car floor and supported on the lower frame;
 an under-car pulley disposed below the car floor;

a pulley support member fixed to the floor support beam and rotatably supporting the under-car pulley; and a linking member linking the vertical frames and the floor support beam, wherein the elevator car is configured such that an upward force exerted on the pulley support member and the floor support beam by a main rope that is wound around the under-car pulley is received by the linking member and the vertical frames, and wherein the linking member is disposed immediately above the under-car pulley such that the linking member and the under-car pulley overlap each other along a front-to-back direction of the elevator car, and such that the upward force acts on the linking member directly without going through the floor support beam and acts from the linking member to the vertical frames.

* * * * *